United States Patent [19]

Ezis

[11] Patent Number: 4,477,402
[45] Date of Patent: Oct. 16, 1984

[54] METHOD OF MAKING SILICON NITRIDE COMPRISING OBJECTS

[75] Inventor: Andre Ezis, Grosse Ile, Mich.

[73] Assignee: Ford Motor Company, Dearborn, Mich.

[21] Appl. No.: 528,228

[22] PCT Filed: Jul. 19, 1983

[86] PCT No.: PCT/US83/01112
§ 371 Date: Jul. 19, 1983
§ 102(e) Date: Jul. 19, 1983

[51] Int. Cl.$^3$ ................................ B28B 7/16
[52] U.S. Cl. ........................ 264/65; 264/325; 264/332
[58] Field of Search .......... 264/65, 332, 325; 501/98

[56] References Cited

U.S. PATENT DOCUMENTS

| | | | |
|---|---|---|---|
| 3,535,132 | 10/1970 | Lunde | 264/332 |
| 3,589,880 | 6/1971 | Clark | 264/332 |
| 3,632,708 | 1/1972 | Mandorf | 264/332 |
| 4,377,542 | 3/1983 | Mangels | 264/65 |

FOREIGN PATENT DOCUMENTS 48-26927 8/1973 Japan ........................... 264/332

OTHER PUBLICATIONS

Giachello et al., "Sintering of Silicon Nitride in a Powder Bed", *J. Natural Science*, 14 (1979), pp. 2825-2830.

*Primary Examiner*—John A. Parrish
*Attorney, Agent, or Firm*—Joseph W. Malleck; Olin B. Johnson

[57] ABSTRACT

A method of making a heat fused silicon nitride comprising object is disclosed. A series of measured powder shots are containerized to be carried in the container between the nitriding and heat fusing steps. The containerization comprises lining the internal wall of a graphitic sleeve, treated for inertness, with a refractory metal foil essentially impervious to migration of carbon ions and having a thickness of 0.2 inches or less. A series of measured shots, of a powder mixture of silicon and oxygen carrying agents, is inserted into the assembly, each shot being separated by an inert spacer. The assembly is subjected to a nitriding treatment and subsequently hot pressed/and or sintered.

8 Claims, 1 Drawing Figure

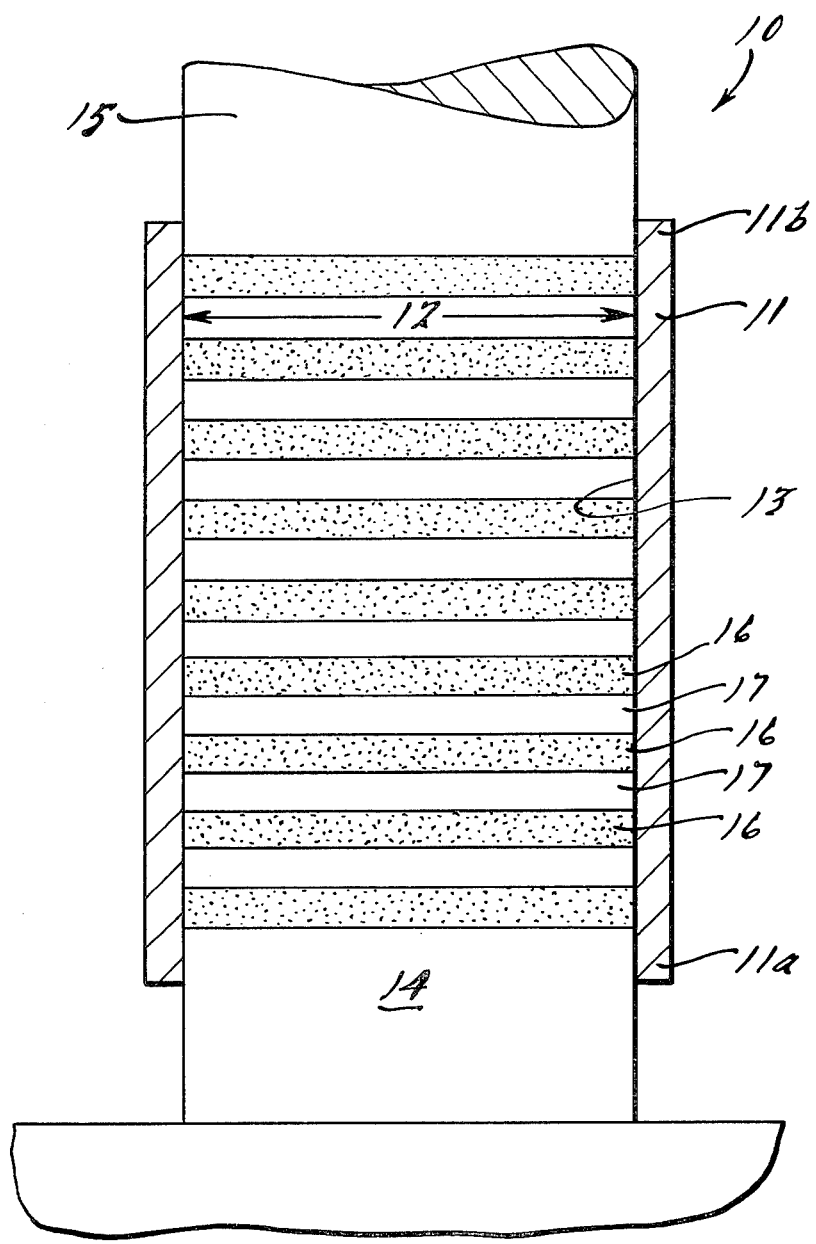

METHOD OF MAKING SILICON NITRIDE COMPRISING OBJECTS

BACKGROUND OF THE INVENTION AND PRIOR ART STATEMENT

In the art of making hot pressed or sintered ceramics, graphite has been frequently used to form the elements of the hot pressing or sintering fixture, the fixture being used to contain the ceramic materials for densification. Graphite is selected for such use because it is relatively strong at high temperature conditions (i.e., 1000°–2000° C.), it has a low modulus of elasticity at high temperatures, and, most importantly, it is excellent for coupling with an induction magnetic field to indirectly heat the ceramic material contained within the graphite elements (see U.S. Pat. Nos. 3,632,708 and 4,071,372). Unfortunately, the graphite frequently reacts with the ceramic material at the high temperature and/or pressure conditions of hot pressing or sintering, forming an unwanted material on the fixture which must be removed for subsequent processing. In sintering, this has been indirectly alleviated by packing of the ceramic material to be sintered in a loose, discardable powder (see U.S. Pat. No. 4,179,486) which may add to the cost of complexity of processing.

In the art of nitriding silicon particles to form silicon nitride by gas phase reaction in a heated furnace, graphite has been used only as a structural wall or felt material located remotely from the silicon to be nitrided, thus avoiding the unwanted reaction by intimate contact with the silicon powder (see U.S. Pat. No. 3,244,480).

It would be desirable in the processing of silicon (to a fully dense silicon nitride object) to combine the arts of cold compaction, nitriding, and hot pressing/or sintering in a continuous procedure. This would obviate frequent handling of the materials to be worked and frequent rearrangement of the processed materials, all of which is costly and can promote flaws if not carried out correctly.

SUMMARY OF THE INVENTION

The invention is a method of making a heat fused silicon nitride comprising object, which method improves the economy and dimensional accuracy of making the object. The method comprises: (a) containerizing at series of measured powder shots in a common assembly to be used for both nitriding and heat fusing steps, the containerization being carried out by (i) lining the internal wall of a graphite sleeve, treated for inertness, with a refractory metal foil essentially impervious to the migration of carbon ions an having a thickness of less than 0.020 inch, (ii) inserting a series of measured shots of a powder mixture of silicon and oxygen carrying powder agents into said lined sleeve, preselected groups of said powder shots being separated by an inert spacer, preferably a parting agent treated silicon nitride spacer; (b) heating the assembly with said shots of powder mixture therein in a nitriding atmosphere to a temperature below the melting point of silicon to convert each of said powder mixture shots to a nitrided silicon body consisting essentially of silicon nitride, 5–17% oxynitrides, and less than 0.5% unreacted oxygen carrying agents, said nitrided silicon body having a density less than that required and a dimension greater than required; and (c) heating the assembly with the nitrided silicon bodies therein with pressure normally associated with hot pressing to a temperature above the melting point of silicon and for a period of time to heat fuse the constituents of said silicon nitrided bodies together, forming a silicon nitride body of required dimension and density.

Preferably, the impervious foil is selected from the group consisting of Mo, Nb, Ta, and W, and preferably the oxygen carrying agents consist of by weight of the silicon metal mixture 1–3.5% $SiO_2$, 0.4–4% $Al_2O_3$, and 6.2–17.8% $Y_2O_3$. Preferably, the shots of powder mixture are cold pressed into preformed discs prior to insertion into the sleeve. Preferably, the nitriding involves heating in an evacuated furnace to 650° C., filling the furnace with a nitrogen mixture, and treating to a nitriding temperature above 1000° C. at a slower rate of heat-up, while interrupting such heat-up to replenish nitrogen when needed. The heat fusion step is preferably carried out by hot pressing at 1600°–1760° C. under a pressure of 2500–3800 psi.

SUMMARY OF THE DRAWING

FIG. 1 is a central sectional elevational view of the containerization assembly used in this invention; pistons 14 and 15 are shown for illustration of how pressing assembly fits thereto and are not part of containerization assembly.

BEST MODE FOR CARRYING OUT THE INVENTION

A preferred method for making a heat fused silicon nitride comprising object according to this invention is as follows.

1. Containerization in a Common Assembly

A series of measured powder shots are containerized in a common assembly 10, the assembly to be used for both nitriding and heat fusion steps. The containerization is carried out as follows:

(a) A graphite sleeve 11, with an internal diameter 12, designed to define approximately the outer diameter of the finished product, has the interior wall thereof lined with a refractory metal foil 13. The sleeve is made inert with respect to surface activity by heat treating the graphite sleeve in an evacuated furnace to a temperature level of about 550° C. for 5–60 minutes, and then heating the grahite sleeve to a temperature of about 1000° C. under a nitrogen atmosphere for 5–60 minutes. The nitrogen may be admitted to the evacuated furnace at such time as the sleeve has been held at the 550° C. temperature for at least five minutes.

The refractory metal foil should be of a type that is essentially impervious to the migration of carbon ions therethrough under conditions herein described, and preferably is selected from the group consisting of molybdenum, tantalum, niobium, and tungsten. The thickness of the metal foil should be less than 0.02 inch and preferably in the range of 0.005–0.020 inch, preferably 0.001 inch thick.

Prior to installing the impervious foil, the sleeve may be lined with one or more graphite foils. The graphite foil should be adhered tightly to the inside surface of the sleeve by prior coating of the sleeve interior with boron nitride slurry and then a dried contact adhesive using rolling pressure to eliminate all air pockets. The graphite foil may be coated with a dried contact adhesive on its interior to receive the impervious foil (here molybdenum), again rolling the Mo foil into tight, smooth contact.

(b) A series of measured shots 16 of a powder mixture of silicon and oxygen carrying powder agents are inserted into the lined graphitic sleeve (see copending U.S. application Ser. No. (82-615) for complete disclosure of the ingredients of the mixture, and which disclosure is incorporated herein by reference). Essentially, the mixture is of the component system comprising Si metal, 1-3.5% $SiO_2$, 6.2-17.8% $Y_2O_3$, and 0.4-4% $Al_2O_3$. Each powder shot is separated (and enclosed at the open ends) by an uncontaminated silicon nitride spacer 17, preferably having a density of no greater than 2.7 gm/cc and is devoid of oxygen carrying agents that promote densification. Each $Si_3N_4$ spacer is coated with a parting agent such as BN. This will preclude fusion between powder shots and spacer material. Each measured shot is preferably in the quantity range of 200-2000 grams, which is effective to provide for a disc shaped billet having a thickness of about 0.20-2.0 inches and a diameter of approximately 6 inches, when the powder shot is fully densified. The thickness of the spacer is in the range of 0.25-0.50 inch and has a diameter substantially equal to the interior diameter 12 of the lined graphitic sleeve.

Alternatively, the shots of powder mixture may be cold pressed to form preforms of a disc shape that will fit closely within the sleeve. The preforms are loaded like chips with a parting agent placed between, which can be Mo, Nb, W, Ta or graphite foil with a BN coating. The sleeve is now loaded with material but essentially open at both ends.

2. Nitriding

The common assembly with the shots of powder mixture therein is heated within a furnace in a nitriding atmosphere to a temperature below the melting point of silicon. Heating in the nitriding atmosphere is carried out for a time sufficient to convert each of the powder mixture shots to be a nitrided silicon body consisting essentially of alpha silicon nitride, 5-17% oxynitrides, and less than 0.5% unreacted oxygen carrying agents. The nitrided silicon bodies will each have a density and a dimension less than that to be eventually required in the final product.

A preferred nitriding cycle is to heat the common assembly in an evacuated furnace to a pressure of about minus one micron and heat at a relatively fast heat-up rate (about 270° F./hr) to a temperature level of about 950° C. However, intermediate such heat-up rate, a nitrogen containing atmosphere is introduced to the furnace, for example, at a temperature level of about 650° C. The nitrogen containing atmosphere is injected into the furnace until a pressure of about 2.7 psig is obtained. The nitrogen containing atmosphere may consist optimally of a gaseous mixture of nitrogen, about 3% by weight hydrogen, and 20-25% by weight helium. When the temperature level of about 950° C. is reached, the common assembly is then heated at a slower heat-up rate (such as 110° C./hr) to about 1095° C. Through subsequent nitriding temperatures of 1095°-1404° C., the heat-up rate reduces even more (such as 2°-3° C./hr). During such slower heat-up rate, the nitrogen will begin reacting with the silicon causing a depletion of nitrogen within the nitriding atmosphere and thereby requiring replenishment. It is desirable to replenish such nitrogen by a nitrogen demand system whereby upon a sensing of a drop in the furnace atmosphere pressure below a specific amount additional nitrogen is introduced, preferably pure nitrogen without any other diluents. After the common assembly is heated to the ultimate nitriding temperature, and after no further nitrogen depletion is noticed, the common assembly is then heated according the the following step.

3. Heat Fusion

The common assembly with the nitrided silicon bodies therein is subjected to hot pressing. The hot pressing assembly consists of a pressing frame with hydraulics, to operate a ram, a graphite die assembly with graphite pistons 14 and 15 which fit into the assembly as shown in the FIGURE (to receive the pressing force), and induction heating coils surrounding the graphite die assembly. The heating is carried out in increments: (1) mechanical loading of 100 psi is applied to the pistons at room temperature; (2) the temperature is then increased to 1800° F. (982° C.) and pressure increased to 500 psi; (3) the temperature is then increased to 2500° F. (1371° C.) and presure is simultaneously increased to 2500 psi; (4) the temperature is finally increased to the ultimate hot pressing temperature of 3182° F. (1750° C.) and pressure increased to 3700-3800 psi, the latter conditions being maintained until at least 99% or desirably 99.5% of theoretical full density is achieved; this usually requires 0.25-3.0 hours at the hot pressing temperature. The assembly is then cooled at any rate, even quenched, to room temperature. The resulting object will consist of beta silicon nitride, 5-17% by weight silicon oxynitrides, predominantly $Y_1SiO_2N$, enveloped by an aluminum containing silicate phase having a thickness of 2-10 angstroms and having no microporosity. The object will preferably possess a hardness of about 88-92 on the 45-N scale, a density of 3.2-3.35 gm/cm$^3$, an average flexural strength greater than 85,000 psi at 1200° C. in a 4-point bend test, and an oxidation resistance that prevents wieght pickup by the object after 450 hours in air at 1000° C.

EXAMPLES

A series of silicon nitride billets or samples were prepared and tested under varying conditions of the containerization method to illustrate how variations in processing facilitate or deny obtaining the advantages of this invention. The results are summarized in Table 1. Each sample consisted of filling a graphite sleeve with powder shots and spacers dileneated in the preferred mode except as varied in columns 4 and 5. The sleeves were lined with foil again as in the preferred mode except for the variations listed in columns 2 and 3. The assembly was nitrided and hot pressed.

TABLE 1

| Sample | Preparation of Graphite Sleeve | Use of Foil Lining | Usage Of Spacers | Thickness of Spacers | Did Assembly Chemically React With Bodies During Process? | Were Pressed Billets Dimensionally Accurate? |
|---|---|---|---|---|---|---|
| 1 | inert treated | Mo .001" | Si₃N₄ | .375" | No | Yes |
| 2 | not treated | Mo .001" | " | " | Yes | Some Adherence |
| 3 | inert treated | Ta .001" | " | " | No | Yes |
| 4 | inert treated | W .001" | " | " | No | Yes |
| 5 | inert treated | None | " | " | Yes | No |
| 6 | inert treated | " | Graphite | " | Yes | Some Adherence |

I claim:

1. A method of making heat fused silicon nitride comprising objects, by the steps of:
    (a) containerizing a series of measured powder shots in a common assembly to be used for both nitriding and heat fusion steps, the containerization being carried out by:
        (i) lining the internal wall of a graphitic sleeve, treated for inertness, with a refractory metal foil essentially impervious to the migration of carbon ions and having a thickness of 0.02 inches or less,
        (ii) inserting a series of measured shots of a powder mixture of silicon and oxygen carrying agents into said lined sleeve, preselected groups of said powder shots being separated by an inert spacer,
    (b) heating said assembly with the shots of powder mixture therein in a nitriding atmosphere at a temperature below the melting point of silicon to convert each of said powder mixture shots to a nitrided silicon body consisting essentially of silicon nitride, 5–17% by weight oxynitrides, and less than 0.5% by weight unreacted oxygen carrying agents, said nitrided silicon bodies having less than required density and a dimension greater than required; and
    (c) heating said assembly with the nitrided silicon bodies therein, with pressure normally associated with hot pressing, to a temperature above the melting point of silicon to heat fuse said silicon nitride and oxynitrides together, forming a predominantly silicon nitride body of required dimension and density.

2. The method as in claim 1, in which the refractory metal foil is selected from the group consisting of molybdenum, niobium, tantalum, and tungsten.

3. The method as in claim 1, in which step (b) comprises heating said assembly in an evacuated furnace to a temperature level of about 1000° C., said furnace being filled with a gaseous mixture of nitrogen prior to reaching said temperature level of 1000° C., continuing to heat to above 1000° C. at a slower rate of heat-up while interrupting said heat-up rate to allow for replenishment of nitrogen consumed during such heating as a result of chemical reaction between the silicon and the nitrogen atmosphere.

4. The method as in claim 1, in which the heat fusion of stop (c) is carried out by hot pressing at a temperature of 1600°–1760° C. under a pressure of 2500–3800 psi.

5. The method as in claim 1, in which said graphitic sleeve and elements are heat treated to achieve inertness by heating in a vacuum to a temperature level of 550° C. and thence to the temperature level of 1000° C. under a nitrogen atmosphere.

6. The method as in claim 1, in which said inert spacer consists essentially of uncontaminated silicon nitride.

7. The method as in claim 7, in which the uncontaminated silicon nitride spacer has a density of no greater than 2.7 gm/cc and is devoid of oxygen carrying agents or agents that promote densification.

8. The method as in claim 7, in which the spacers have a thickness in the range of 0.2–0.5 inch.

* * * * *